Figure 1:
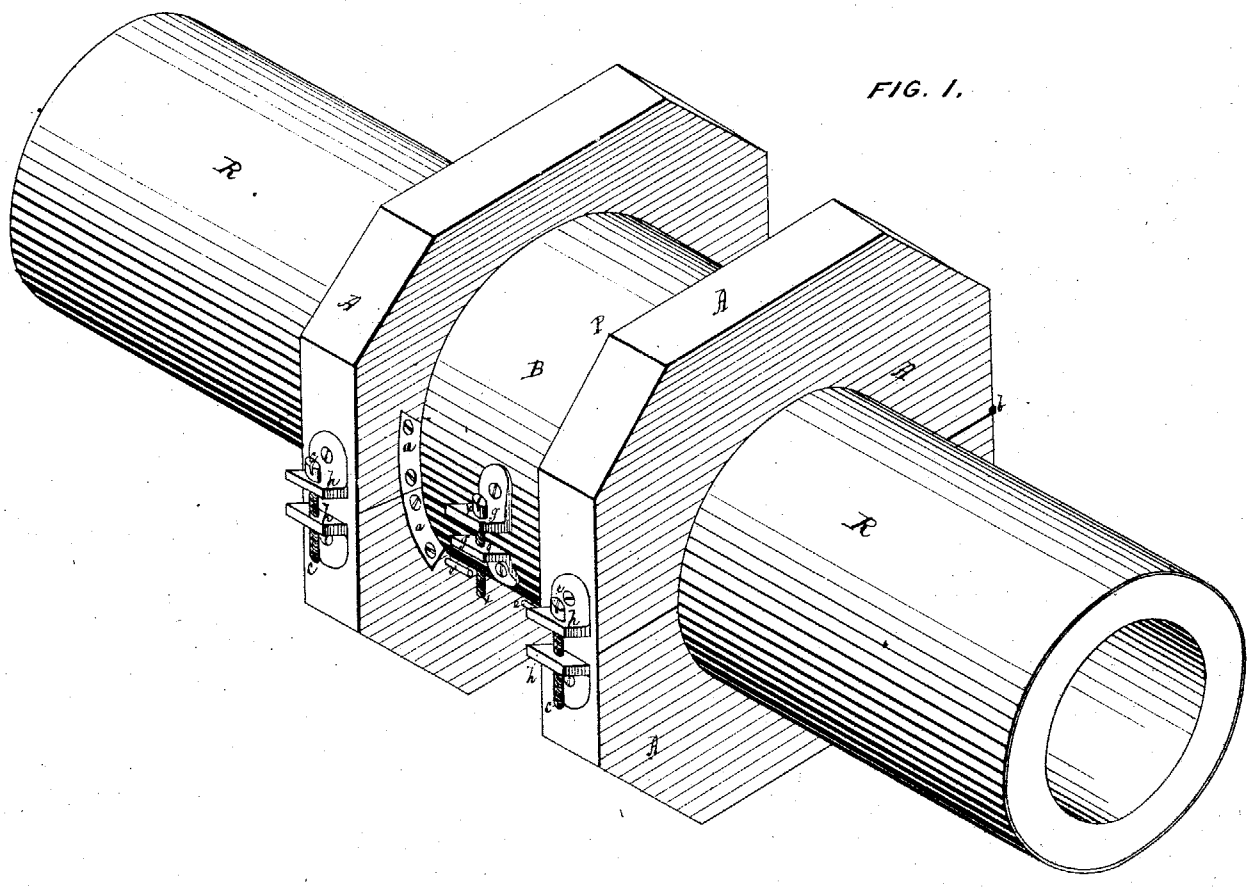

2 Sheets--Sheet 1.

P. BALL.

Pipe-Joints.

No. 6,048.

Reissued Sept. 15, 1874.

WITNESSES:

D. G. Stuart

W. Knight

INVENTOR:

Phinehas Ball, per. P. Hannay

Attorney.

P. BALL.
Pipe-Joints.
No. 6,048. Reissued Sept. 15, 1874.
FIG. II.
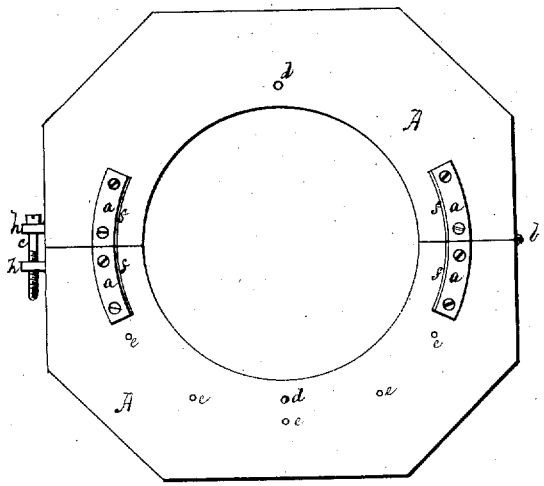
FIG. III.
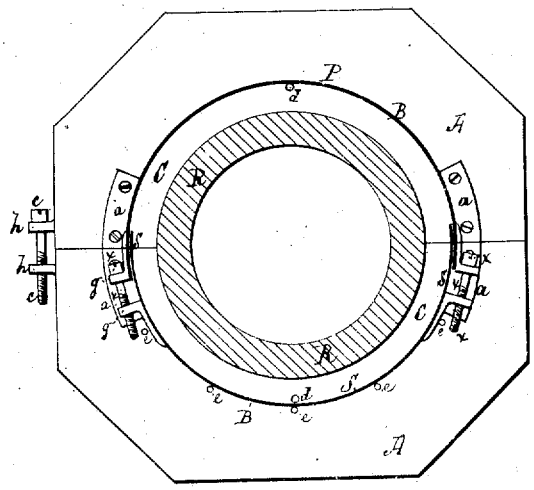
FIG. IV.
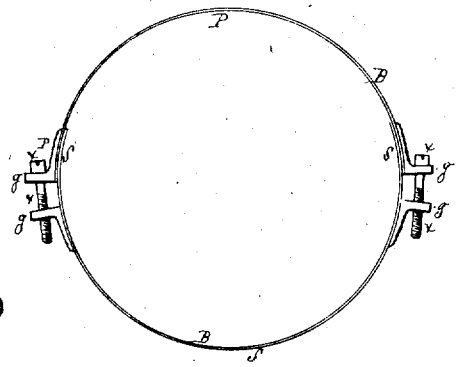
WITNESSES:
D. G. Stuart
J. G. Knight
INVENTOR:
Phinehas Ball
per
A. Hamway
Attorney

BEST AVAILABLE COPY

UNITED STATES PATENT OFFICE.

PHINEHAS BALL, OF WORCESTER, MASSACHUSETTS.

IMPROVEMENT IN PIPE-JOINTS.

Specification forming part of Letters Patent No. 50,090, dated September 26, 1865; reissue No. 6,018, dated September 15, 1874; application filed August 18, 1874.

*To all whom it may concern:*

Be it known that I, PHINEHAS BALL, of Worcester, in the county of Worcester and State of Massachusetts, have invented certain new and useful Improvements in Pipe-Joints; and I do hereby declare that the following is a description of the same, reference being had to the accompanying drawings, forming part of this specification, in which—

Figure 1 represents a view, in perspective, of my improvements as applied to the joint prior to the removal of the clamp-guides. Fig. 2 represents a side view of one of the clamp-guides detached from the pipes and joint. Fig. 3 represents a central cross-section, as taken through the center of the sleeve in Fig. 1. Fig. 4 represents an end view of the sleeve or compressing-ring, detached.

Heretofore many difficulties have been experienced in connecting the ends of cement-lined or other water-pipes together, so as to make practical water-tight joints, especially when the pipes are of large diameter. This I overcome to a certain extent by combining with the pipes, whose ends are to be joined together, a sleeve or ring in such manner as to break joint, and by then filling the space between them with a packing of cement or other material capable, when set or hardened, of withstanding the pressure and penetrating influence of the water, and which, at the same time, is not susceptible of being dissolved or softened in the latter. While this plan is a great improvement over the old methods of connecting the pipes together, yet, in practice, it is found that the sleeve is more or less liable to be left out of position when the joint is finished—that is to say, the joint may be too near one end of the sleeve and too far from the other, instead of being, as it ought to be, at or near its middle, or, as may happen by careless handling, not under the sleeve at all. This I remedy by the use of a couple of clamp-guides, (one for each pipe,) which are so arranged with respect to the end of each pipe as that, when the ends are brought in contact with each other, the sleeve will simply fit within the two. The clamp-guides for this purpose are each temporarily fastened to their respective pipes at equal distances from the ends, thus insuring a central arrangement of the sleeves immediately over the joint when fitted thereon. Again, some difficulty is experienced even with the use of a sleeve in so packing the joint between the latter and the pipes as to leave the packing free from faults and perfectly water-tight. This I overcome by the use of a compressing-sleeve—that is to say, a sleeve in which at least one of its sides is open, that its ends may be made to overlap and afterward drawn together, so as to lessen the diameter of the ring thus formed, and thereby compress such hydraulic mortar or cement as may be interposed between it and the pipes, the clamp-guides, with this object in view, also serving the purpose, during the compressing process, of holding the cement in place at the sides until the cement has become fairly set and sufficiently hardened, after which they are removed to aid in forming a new joint. Again, as under ordinary circumstances, the sleeve, on being compressed, is liable to be drawn nearer to the pipe on some one side than on the other, thereby creating a tendency to weaken, and otherwise make an imperfect joint. I obviate that difficulty by securing to the inner faces of both halves of each clamp-guide projecting flanges, so arranged, with respect to the pipes, as to arrest the further compression of the sleeve after it has been brought to the point at which the thickness of the packing is intended to be left, these flanges being so arranged as to leave the packing of an even thickness all around. Or, instead of flanges, stop-pins, similarly arranged at suitable intervals apart, may be used, and at such distance from the pipes as to give the required thickness of packing. And, lastly, my improvement consists in providing the clamp-guides with suitable supports for the sleeve while the packing is being fitted in by hand, and which otherwise is a very difficult and troublesome operation to perform.

To enable others skilled in the art to make, construct, and use my improvement, I will now proceed to describe its parts in detail.

The pipes R R, which are to be joined together, whether made of cement, iron, wood, lead, or *papier-maché*, &c., are first brought together end to end. In this position the clamp-guides A A are then placed around the ends of the pipes at equal distances from the joint, and at a distance far enough apart to just admit the sleeve B between them. These clamp-guides A A may, for convenience of handling, be made in two parts, and are

BEST AVAILABLE COPY hinged on one side, as seen at *b*, and bolted together on the other in such manner as to be easily adjusted to slight inequalities in the pipes, and so as to bring sufficient pressure upon the ends of the pipes to prevent injury thereto from any unequal pressure which may be brought upon their ends by the pressure of the sleeve when its filling C is compressed. Guides *a a* are placed upon the clamps having projecting circular flanges *f* upon their inner edges, and which guide-flanges are placed upon the clamps as far from the surface of the pipe as the thickness of the filling of the sleeve requires. Pins *d* are placed in the sides of the clamps A A, as indicated in the drawings, the object of the guides *f* and pins *d* being to keep the sleeve, when compressed by the screws *x x*, which pass through ears *g* fastened to both parts P and S of sleeve B, from ever displacing the mortar, so as to bring the sleeve in closer contact with the pipes at one point than another. The pins *e e e*, in the lower half of clamps A A, are placed a little farther off from the surface of the pipes than the flanges *f* and pins *d*, so that when the lower half, S, of the sleeve is placed in position to be filled it will rest thereon and be firmly supported, and that independently of the hand of the operator, and thereby be retained at a proper distance from the pipe while the cement is being filled in. Thus the pins *e e e* form a bottom support to the sleeve B, while flanges *f*, upon the guides *a a*, and pins *d* arrest the sleeve upon the inside, and prevent it, during the compressing operation, from being drawn too near to the pipe at any one point. The clamp-guides A A also serve to prevent the packing or filling C from being forced out laterally from under the sleeve when the parts P and S of sleeve B are drawn together during the compressing operation.

The operation is as follows, viz: The clamp-guides A A are first placed upon the pipes at the proper distance apart to receive the sleeve. The lower half S of the sleeve is then placed between these clamps, so as to rest upon the pins *e e*. The space between the sleeve and pipes is then filled with the cement C, or other suitable packing, from the sides. After the lower half has been thus filled sufficient cement or packing to entirely fill the sleeve, when compressed, is then spread over the top half of the pipe, and the upper half of the sleeve applied and screwed down by the screws *x x* until sufficient compression has been obtained to make the mortar as compact as desired. The lower half of the sleeve is made more than one-half of the circle required, and the upper half nearly or quite the half, so that the upper half fits over the lower half, and thus makes the joint entirely tight, the ears *g*, through which the compressing-screws *x x* pass, being so arranged as to give the requisite space between them for that purpose, as indicated in the drawings.

The filling C may be composed of common, Portland, or Roman cement, properly prepared, or of a melted composition of bitumen and clay, or asphaltum tempered to the requisite plastic state by heat, and an admixture of coal-tar and clay, and applied while warm in a similar manner to that employed in filling with cement, and the pressure then applied thereto while the mass is cooling. After the cement or other packing has been thoroughly set and sufficiently hardened, the guides A A may then be removed, and applied, as before, to the making of a new joint.

The clamp-guides A A may be made in segments, the number depending on the size of the pipe, and these then attached to a flexible band of iron to permit the segments to conform to the shape of the pipe, whether elliptical or otherwise. The inner face of these guides A A may be lined with some elastic substance, such as leather or gutta-percha, to prevent injury to the pipes when fastened to them by their screws or bolts *c c*, and which, for this purpose, are made to pass through ears *h h* on the clamp, as fully shown in the drawings.

After the sleeve B (and which, as a rule, is made of sheet metal) has been applied, as above described, and guides A A removed, the former is then covered with a coating of the filling used, so that no corrosion of the metal of the sleeve may take place.

The ears *g* are formed of stout and stiff angular metal plates, and are firmly riveted at suitable points to the pieces P and S, which form sleeve B.

Having described my improved joint, what I claim as new, and desire to secure by Letters Patent, is—

1. The combination, with the ends of the pipes R R, of guide-clamps A A, for the purpose set forth.

2. The combination, with the clamps A A, of the flanges *f f* or pins *d d*, substantially as and for the purposes set forth.

3. The combination, with the under side of the clamps A A, of pins *e e*, for sustaining the lower half of the sleeve while being filled, as described.

4. The combination, with the overlapping parts P and S, of the ears *g g* and screws *x x*, for the purposes set forth.

5. The combination, with two adjacent flangeless pipes, of a sheet-metal compressing-ring, B, substantially as and for the purpose set forth.

6. The combination of a compressing-ring, B, and a cement or analogous packing, C, with the ends of two adjacent pipes, substantially as and for the purposes set forth.

7. The combination of the compressing-ring B, side walls A A, and packing C with the ends of two adjacent pipes, all operating substantially as and for the purposes set forth.

Witnesses: PHINEHAS BALL.
BENAIAH FITTS,
ABIEL E. WILSON.